(12) United States Patent
Poulsen et al.

(10) Patent No.: US 12,041,566 B2
(45) Date of Patent: Jul. 16, 2024

(54) STATIONARY MEASURING DEVICE FOR MEASURING OR DETECTING A VALUE AT A UTILITY INSTALLATION

(71) Applicant: Kamstrup A/S, Skanderborg (DK)

(72) Inventors: Jonas Drammestrup Poulsen, Skanderborg (DK); Kristian Stobbe, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 406 days.

(21) Appl. No.: 17/543,641

(22) Filed: Dec. 6, 2021

(65) Prior Publication Data

US 2022/0182955 A1    Jun. 9, 2022

(30) Foreign Application Priority Data

Dec. 7, 2020    (EP) .................................... 20212202

(51) Int. Cl.
| | | |
|---|---|---|
| *H04W 24/10* | (2009.01) | |
| *H04J 3/06* | (2006.01) | |
| *H04L 43/0864* | (2022.01) | |
| *H04W 56/00* | (2009.01) | |
| *H04W 84/12* | (2009.01) | |

(52) U.S. Cl.
CPC ....... *H04W 56/0015* (2013.01); *H04J 3/0638* (2013.01); *H04L 43/0864* (2013.01); *H04W 24/10* (2013.01); *H04W 84/12* (2013.01)

(58) Field of Classification Search
CPC . H04W 56/0015; H04W 24/10; H04W 84/12; H04W 4/38; H04W 56/001; H04J 3/0638; H04J 3/0667; H04L 43/0864; H04Q 9/00; H04Q 2209/60
See application file for complete search history.

(56) References Cited

U.S. PATENT DOCUMENTS

| | | | |
|---|---|---|---|
| 10,257,798 B1 * | 4/2019 | Koelemeij | .......... H04W 56/006 |
| 2017/0230074 A1 | 8/2017 | Rose et al. | |
| 2019/0053013 A1 | 2/2019 | Markhovsky et al. | |
| 2022/0006547 A1 * | 1/2022 | Hoptroff | ................. H04L 69/28 |

FOREIGN PATENT DOCUMENTS

WO    2019103696 A1    5/2019

\* cited by examiner

*Primary Examiner* — Chuong A Ngo
(74) *Attorney, Agent, or Firm* — McGlew and Tuttle, P.C.

(57) ABSTRACT

A stationary measuring device (7) measures or detects a value at a utility installation. The measuring device includes a low power wide area network (LPWAN) communication module configured to establish a wireless communication connection to a LPWAN for communicating data to a head-end-system (HES) (3) via the LPWAN. The LPWAN communication module is configured to: send a request for a first clock time from the measuring device to a time server; receive the first clock time from the time server in response to the request; receive a second clock time from a base station of the LPWAN; compare the first clock time and the second clock time with each other; and determine a current clock time based on the second clock time if the second clock time lies within a pre-determined range about the first clock time.

16 Claims, 7 Drawing Sheets

STATIONARY MEASURING DEVICE FOR MEASURING OR DETECTING A VALUE AT A UTILITY INSTALLATION

CROSS REFERENCE TO RELATED APPLICATIONS

This application claims the benefit of priority under 35 U.S.C. § 119 of European Application 20212202.4, filed Dec. 7, 2020, the entire contents of which are incorporated herein by reference.

TECHNICAL FIELD

The present disclosure relates to a stationary measuring device for measuring or detecting a value at a utility installation, in particular to a consumption meter for registering a consumption of electric power, water, gas, or thermal energy.

TECHNICAL BACKGROUND

It is known that utility providers of electricity, water, gas and/or thermal energy use automatic meter reading (AMR) systems or advanced meter infrastructure (AMI) systems to efficiently and reliably manage customer billing. Such systems may be referred to as "dedicated" meter reading systems. Dedicated meter reading systems are characterized in that consumption meters are installed in a plurality of households, for instance, and communicate consumption data to a head-end-system (HES) via a wireless communication with dedicated data collectors. A single data collector may collect the consumption data read by thousands of consumption meters. Several data collectors may be distributed over a city or region to cover all consumption meters located therein. The consumption meters communicate with the data collectors wirelessly using license-free frequency bands in a manner that saves as much battery-power of the consumption meters as possible, because there is usually, in case of measuring water, gas and/or thermal energy consumption, no opportunity for recharging or exchanging the consumption meter battery. Consumption meters for registering a consumption of electric power, however, do not need to be battery-powered as they are connected to the mains electricity, i.e. utility power.

In order to reduce the cost of implementing and maintaining an infrastructure of dedicated data collectors, a public cellular communications network may be used instead of dedicated data collectors to collect the consumption data. For instance, the consumption meters may comprise a communication module, e.g. a modem, to connect to a Low Power Wide Area Network (LPWAN) provided by a public cellular communications network, e.g. a Narrowband Internet-of-Things (NB-IoT) network or a Long-Term Evolution Machine Type Communication (LTE-M) network. The frequency bands used in such a LPWAN are licensed, but have a relatively large link budget.

It is therefore desirable to provide a consumption meter that is able to efficiently register consumption data regularly via a LPWAN, e.g. hourly or daily. One important aspect of correct registering consumption data is an accurate clock time information, because a consumption must be reliably associated with a correct consumption period in order to ensure a correct billing process. Therefore, a consumption meter is in need of receiving regularly updated clock time information.

It is known to ask a time server in a network for the current clock time using a network time protocol (NTP) by sending an NTP request. However, in contrast to "dedicated" meter reading systems that "own" (includes lease) the data collector infrastructure, a public cellular communications network is part of a "generic" meter reading system, in which the wireless communication infrastructure, i.e. the LPWAN, between the consumption meter and the HES is owned, maintained and controlled by external parties, e.g. mobile network operators (MNO). Using a generic meter reading system, a utility provider (UP) of electricity, water, gas and/or thermal energy only owns (or leases), maintains and controls the consumption meters and the HES. Thus, the "external" LPWAN can introduce high communication latencies that are unknown and unpredictable for the UP. Such communication latencies may negatively affect the accuracy of an NTP response to a non-tolerable degree.

SUMMARY

It is therefore an object of the present disclosure to provide a consumption meter with more reliable and accurate current clock time information. This object may not be limited to consumption meters, but may be applicable to any kind of stationary measuring device for measuring or detecting a value at a utility installation. For example, this may include consumption meters, alarm sensors, acoustic noise detectors, chemical sensors, turbidity sensors, remotely controlled valves or other kinds of monitoring sensors.

According to a first aspect of the present disclosure, a stationary measuring device for measuring or detecting a value at a utility installation is provided, wherein the measuring device comprises a low power wide area network (LPWAN) communication module configured to establish a wireless communication connection to a low power wide area network (LPWAN) for communicating data to a head-end-system (HES) via the LPWAN, wherein the LPWAN communication module is configured to:

send a request for a first clock time from the measuring device to a time server;
receive the first clock time from the time server in response to the request;
receive a second clock time from a base station of the LPWAN;
compare the first clock time and the second clock time with each other; and
determine the current clock time based on the second clock time if the second clock time lies within a pre-determined range about the first clock time.

The request for the first clock time may be an NTP request to an NTP server acting as the time server. The second clock time may be a cellular network time or radio access network (RAN) time transmitted by the base station. The second clock time is preferably independent from the first clock time. The principle idea here is that the base station is used as a second, preferably independent, source of clock time information, because it provides a cellular network time on another layer of the LPWAN communication. For instance, NB-IoT or LTE-M standards as of 3GPP release 11 or later, provide automatically System Information Block 16 (SIB16) that includes the cellular network time. According to the Open Systems Interconnection (OSI) model, the cellular network time may be exchanged on the third OSI layer, i.e. the network layer. In contrast to that, an NTP time received from the NTP server is communicated on the seventh OSI layer, i.e. the application layer. The cellular network time may therefore be less prone to communication latencies than the NTP time.

However, the cellular network time introduces a principle trust issue, because the base station as part of the LPWAN infrastructure is not controlled by the UP. For instance, the used time zone of the cellular network time cannot be trusted, or whether summer or winter time is used. In contrast to that, the NTP time zone including summer/winter time is trusted by the UP, because the UP can choose and/or control the time server. For instance, the time server may be part of the HES or another trusted NTP server. So, the principle idea here is to check if the untrusted cellular network time lies within a certain range about the NTP time. If it does, the cellular network time is trusted and taken as the current clock time, because it has less latency issues than the NTP time.

Optionally, the LPWAN communication module may be further configured to determine the current clock time based on the first clock time if the second clock time lies outside of the pre-determined range about the first clock time, e.g. +/−7.5 minutes or preferably +/−2 minutes. So, if the second clock time, e.g. the cellular network time, cannot be trusted, because it deviates too much from the first clock time, e.g. the NTP time, the first clock time may be chosen as the most trusted time information. An inaccuracy of the first clock time, e.g. the NTP time, due to latencies may be accepted in this case.

As an alternative option, the LPWAN communication module may be further configured to
  determine a first difference between the first clock time and the second clock time if the second clock time lies outside of the pre-determined range about the first clock time;
  determine a residual between the first difference and a whole-numbered multiple of a quarter of an hour, and
  determine the current clock time based on a second difference between the second clock time and the whole-numbered multiple of a quarter of an hour if the residual lies within the pre-determined range about the first clock time.

As the second clock time, e.g. the cellular network time, is likely to be off by a whole-numbered multiple of a quarter of an hour due to a different setting of the time zone or daylight saving time, the current clock time may be adjusted accordingly. The corresponding whole-numbered multiple of a quarter of an hour, i.e. the assumed offset of the cellular network time, may be found for which the residual is minimal. Thus, the adjusted cellular network time is trusted if the residual lies within the pre-determined range about the NTP time, e.g. +/−7.5 minutes or preferably +/−2 minutes.

Optionally, the LPWAN communication module may be further configured to determine a round-trip time (RTT) between sending the request and receiving the first clock time, wherein the current clock time is determined to be the first clock time plus half of the round-trip time (RTT) if:
  the second clock time lies outside of the pre-determined range about the first clock time period, and
  the determined round-trip time (RTT) is below a pre-determined threshold, e.g. a threshold between 0.5 to 60 seconds, preferably 10 seconds.

Also in this case, the second clock time, e.g. the cellular network time, cannot be trusted, because it deviates too much from the first clock time, e.g. the NTP time. The NTP time as the first clock time is more reliable, but the latency error may be reduced by adding half of the round-trip time (RTT). The rationale here is that a relatively short RTT may be assumed to be symmetric, i.e. an uplink time (ULT) is essentially the same as a downlink time (DLT), wherein RTT=ULT+DLT. It should be noted that the latency issue with NTP time is only introduced by DLT.

Optionally, for long round-trip times (RTT) at or above the pre-determined threshold, i.e. the threshold between 0.5 to 60 seconds, preferably 10 seconds, the LPWAN communication module may optionally be configured to set the current clock time to the first clock time. The rationale here is that half of the RTT would overestimate the latency error, because ULT was found to be much larger than DLT for large RTT, i.e. DLT<RTT/2 for large RTT. As effectively only DLT introduces the latency error, it is better to accept the latency error by DLT than subtracting RTT/2.

Optionally, the LPWAN communication module may be configured to use a Narrowband Internet of Things (NB-IoT) or a Long-Term Evolution Machine Type Communication (LTE-M) technology standard for the wireless communication in the LPWAN, in particular any standard in the group comprising: LTE Cat M1, LTE Cat M2, LTE Cat NB1, and LTE Cat NB2. These standards are particularly useful, because they provide the second clock time automatically, e.g. the cellular network time by System Information Block 16 (SIB16).

Optionally, the first clock time may be an NTP time provided by a network time protocol (NTP) server.

Optionally, the second clock time may be a cellular network time of the LPWAN, in particular comprised in a System Information Block 16 (SIB16) of a LPWAN communication frame.

Optionally, the LPWAN communication module may be configured to discard the received first clock time unless a certain minimum amount of data has been communicated since establishing a LPWAN connection. In other words, the LPWAN connection is "warmed-up" before the first clock time, e.g. the NTP time, is trusted. The latency issues are found to be worst for the first communicated data frames after establishing a LPWAN connection.

Optionally, the LPWAN communication module may be configured to always discard the first clock time received after establishing a LPWAN connection and to request another first clock time. This may ensure a certain warm-up of the LPWAN connection.

Optionally, the LPWAN communication module may be further configured to determine a, preferably adaptive, baseline based on measuring a round-trip time (RTT) between sending the request and receiving the first clock time for each of a pre-determined number of consecutive requests, and to discard any first clock time with a round-trip time (RTT) exceeding the baseline by a pre-determined limit. This reduces the error to the first clock time, e.g. NTP time, introduced by latencies, because the baseline provides an expectation value for RTT and allows to filter out outliers of RTT. The preferably adaptive baseline may be determined on the basis of a sliding window or as a weighted moving average (WMA).

Optionally, the LPWAN communication module may be configured to include discarded round-trip times (RTT) above the baseline for adapting the baseline. This may be important when it comes to a permanent change in the LPWAN that affects the latency in communication, and thus RTT overall. For example, the RTT may make a step, because the used communication standard has changed from LTE CatM1 to LTE Cat-NB. The adaptive baseline for RTT will have to quickly reflect that in order to prevent filtering too many cases of deviating RTT.

Optionally, the time server, e.g. the NTP server, may be part of the HES. This is beneficial for having the time server fully under control. Alternatively, the time server, e.g. the NTP server, could be a trusted time server outside of the HES.

Optionally, the LPWAN communication module may be configured to receive the second clock time from the base station of the LPWAN automatically when it establishes a LPWAN connection with the base station. For instance, by using the above-mentioned standards, the second clock time may be provided automatically, e.g. the cellular network time by System Information Block 16 (SIB16).

Optionally, the measuring device may be a consumption meter for registering a consumption of electric power, i.e. an electricity meter, wherein the electricity meter is powered by a mains electricity, i.e. utility power. As such an electricity meter is not concerned with saving battery power, the LPWAN communication module may be permanently powered-up, or at least for longer periods.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
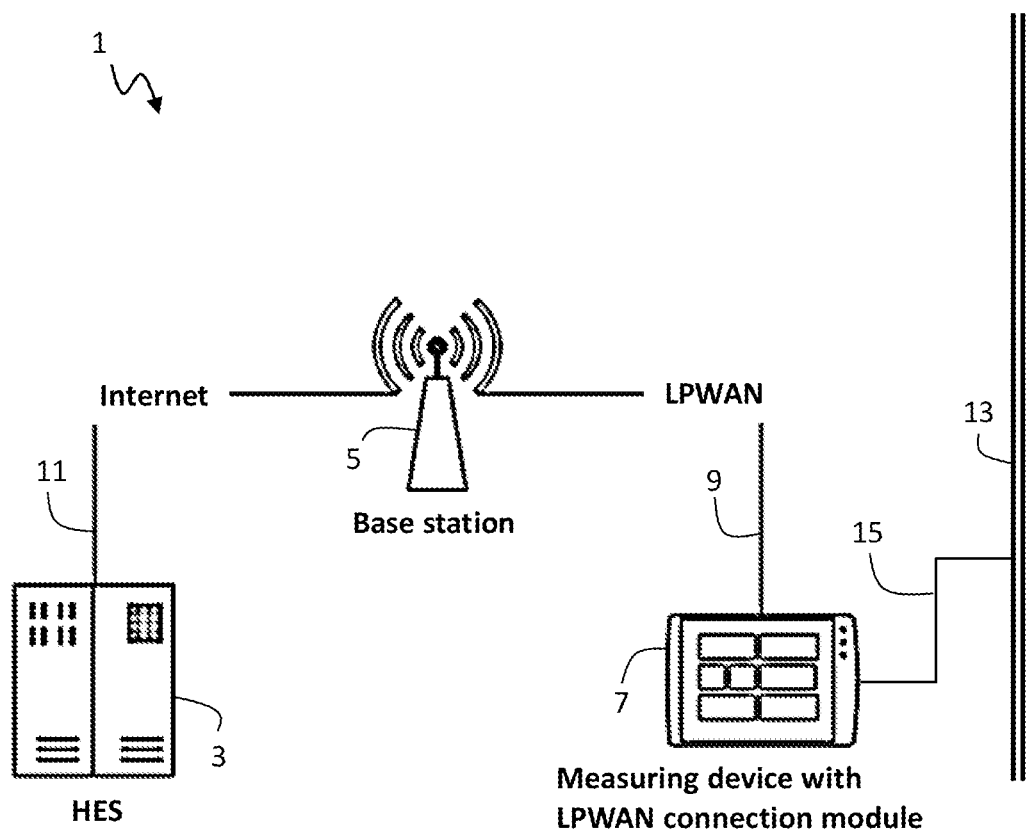
FIG. 1 is a schematic drawing of a meter reading system comprising an example of a measuring device disclosed herein.

Referring to the drawings, FIG. 1 shows schematically a meter reading system 1 comprising a head-end system (HES) 3, a base station 5 of a Low Power Wide Area Network (LPWAN), and a measuring device 7 in form of a consumption meter. The measuring device 7 may be a electricity meter for registering a consumption of electric power at a utility installation, e.g. a private household, a public facility, or an industry facility. The measuring device 7 may alternatively be another kind of consumption meter, an alarm sensor or another kind of monitoring device that is supposed to send regularly information to the HES 3. The HES 3 receives and processes information from and/or controls the behavior of a multitude of measuring devices 7 that are installed in a multitude of utility installations.

The LPWAN is provided by a multitude of distributed base stations 5 of a public cellular mobile communications network. FIG. 1 shows only one of these base stations as the base station 5 the measuring device 7 is currently wirelessly connected with by a connection 9 using a NB-IoT or LTE-M technology standard. The HES 3 is connected to the base stations 5 of the LPWAN via an internet connection 11, preferably by wire or optic fiber.

Once the measuring device 7 has successfully established the connection 9 to the base station 5, it is able to transfer consumption data or any other data that it is supposed to send to the HES 3. The communication may be essentially unidirectional from the measuring device 7 to the HES 3, but preferably bi-directional between the measuring device 7 and the HES 3. A bi-directional communication allows the HES 3 not only to receive the data from the measuring device 7, but also to control and update the behavior of the measuring device 7.

The measuring device 7 may comprise a microcontroller, e.g. a CPU or an FPGA, a permanent or volatile storage medium, e.g. a RAM, a LPWAN communication module, e.g. a modem, a battery, and preferably a human-machine-interface (HMI), e.g. comprising a display, a touchscreen, a button and/or a switch. A sensor module for measuring or detecting a value at a utility installation may be integrated into the measuring device 7 or connected to it by wire or wirelessly. The value may be indicative of a physical quantity, such as an electric current through a power line 13 the sensor module is mounted on. The measuring device 7 is configured to continuously, regularly, or sporadically store the measured or detected value. Alternatively, or in addition, the measuring device 7 may be configured to process, e.g. sum up, the measured or detected value and to store the processed value, e.g. a cumulative value or a consumed utility quantity.

The microcontroller of the measuring device 7 is configured to trigger the LPWAN communication module to send data, e.g. consumption data, according to a pre-determined data transmission schedule, e.g. hourly or daily. Alternatively, or in addition, especially in case of the measuring device 7 being an electricity meter, the HES 3 may request, i.e. poll, the data, i.e. trigger a reading from one or more specific measuring devices 7. For instance, the UP may receive a consumer complaint about missing electricity. The UP may then use the HES to request an extraordinary reading by the measuring device 7 measuring the voltage of each supply phase before sending out a service technician. The data may comprise all or parts of the stored measured, detected or processed value and identification data for identifying the measuring device 7 or the sensor module, or the utility installation respectively.

FIG. 1 shows further a mains electricity line 13 to which the measuring device 7 is connected to by wired connection 15. The measuring device 7 is supposed to register an amount of electric energy consumed at a utility installation via the mains electricity line 13. The measuring device 7 is powered via the connection 15 by the mains electricity line 13, so that saving battery power is not an issue for the measuring device 7.

Figure 2:
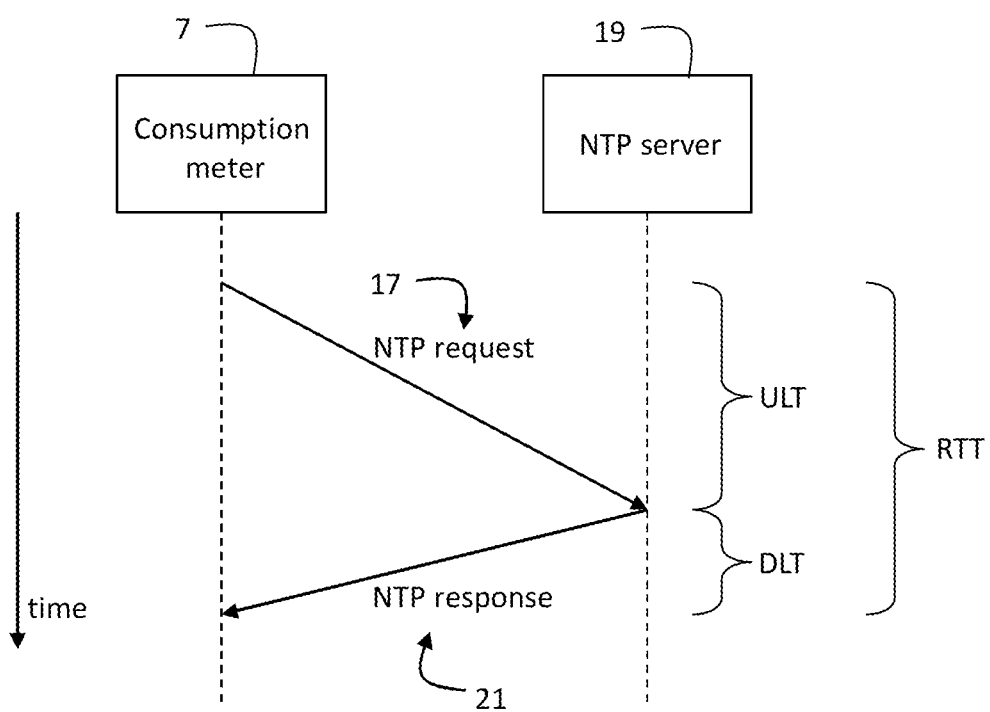
FIG. 2 is a schematic diagram of an example of an NTP request with a latency issue.
Figure 3:
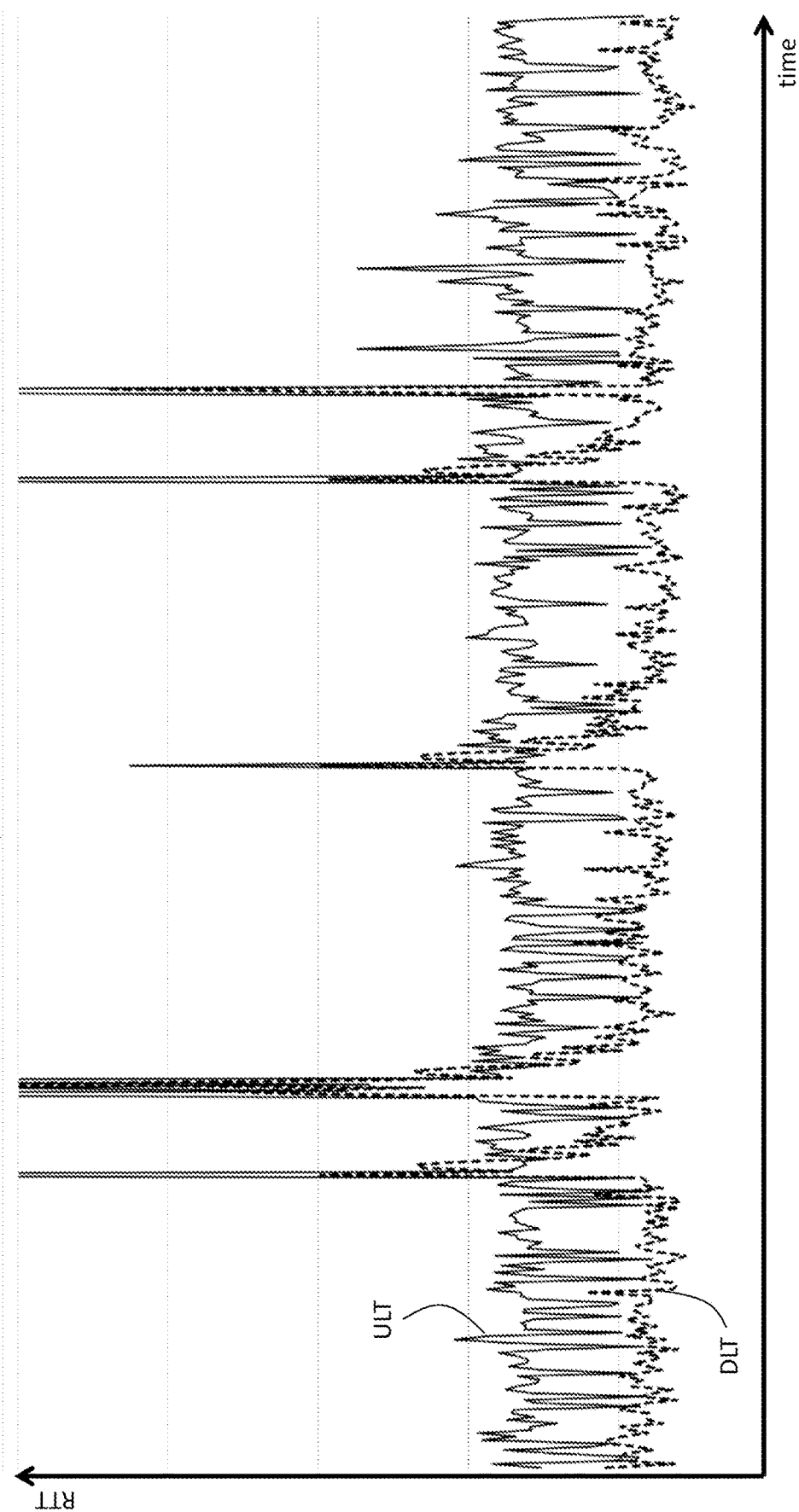
FIG. 3 is a diagram of determined RTT over time for a LPWAN communication module in a radio resource state (RCC) "idle"
Figure 4:
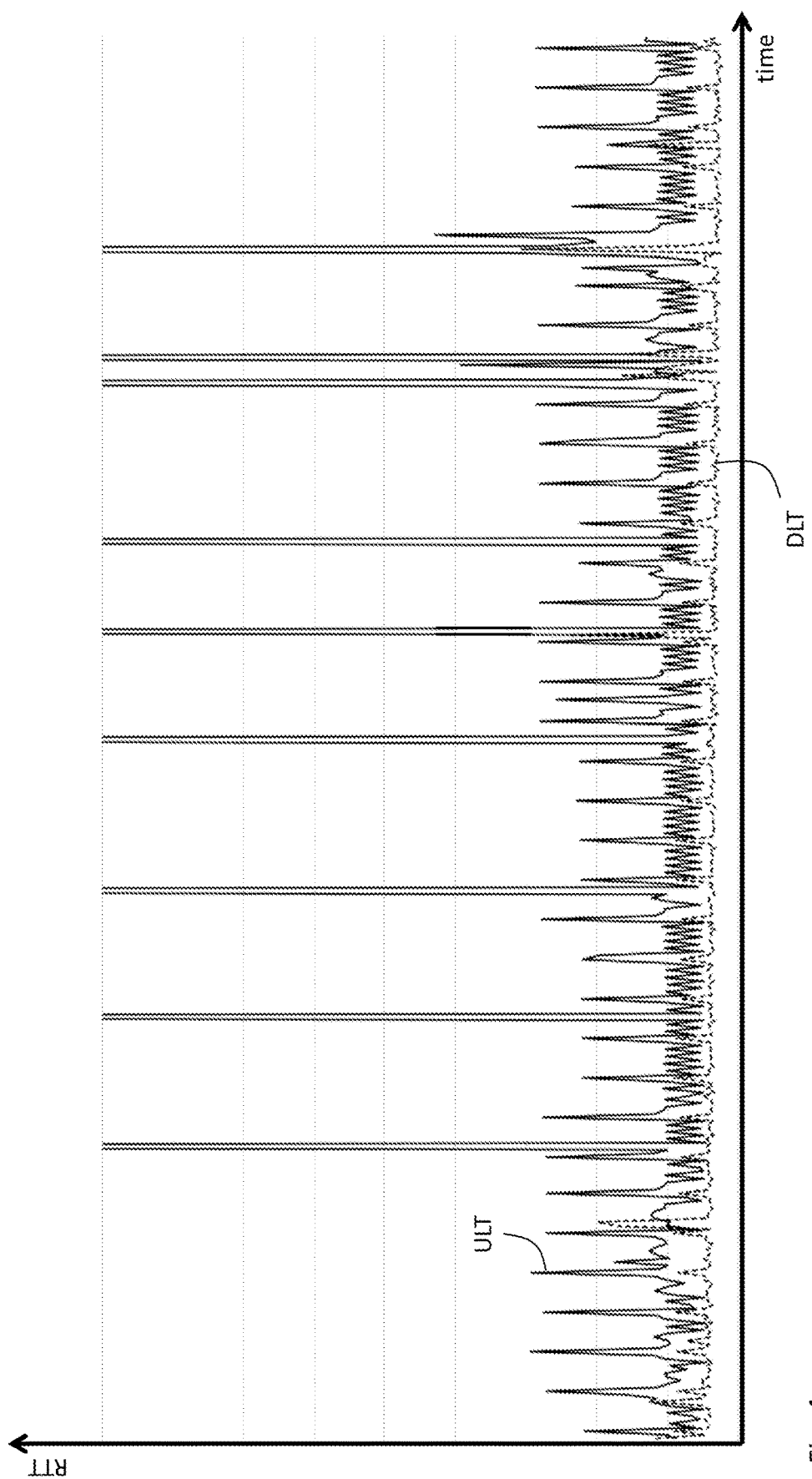
FIG. 4 is a diagram of determined RTT over time for a LPWAN communication module in a radio resource state (RCC) "connected"
Figure 5:
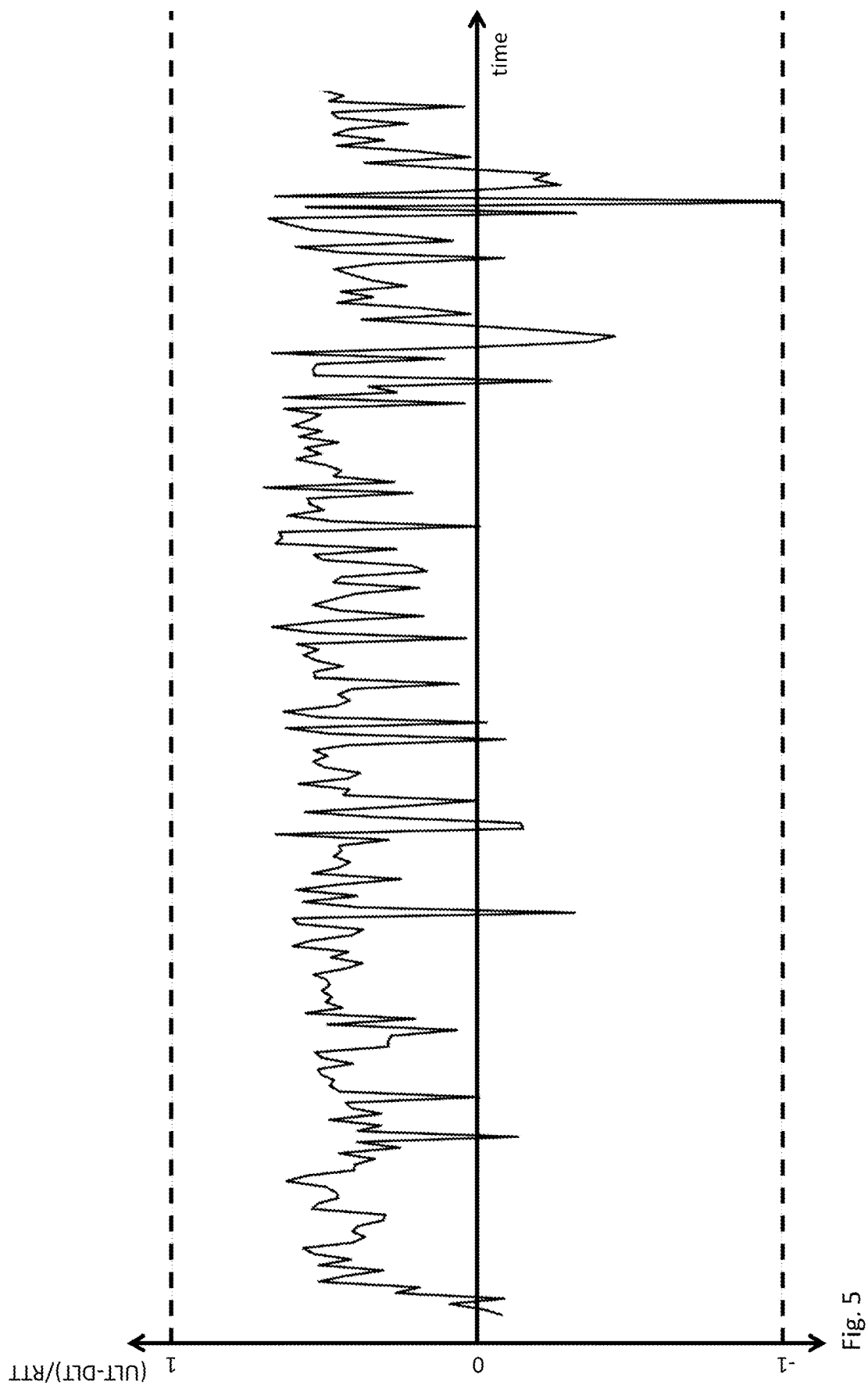
FIG. 5 is a diagram of a differential ULT-DLT as a percentage of RTT over time for a LPWAN communication module.

FIG. 2 shows schematically the latency issue that a NTP time request has. When the measuring device 7 sends a NTP request 17 to an NTP server 19, there is a certain latency, i.e. uplink time (ULT), for the NTP request 17 to reach the NTP server 19. An NTP response 21 from the NTP server 19 takes a downlink time (DLT) to reach the measuring device 7. The round-trip time (RTT) is the sum of ULT and DLT. It should be noted that RTT may be symmetric, i.e. ULT=DLT, but as shown in FIGS. 3, 4 and 5, it is often asymmetric. Mostly, ULT is higher than DLT, but it is unpredictable how RTT splits up into ULT and DLT. The measuring device 7 is able to measure RTT by a timer measuring the time between sending the NTP request 17 and receiving the NTP response 21. However, ULT does not affect the received NTP Time and any latency issue with the received NTP Time is due to DLT alone.

A comparison between FIG. 3 and FIG. 4 shows that the latency issues are worst for the first data exchange after the LPWAN communication module switched from a radio resource control (RRC) state "idle" to "connected" (see. FIG. 3). FIGS. 3 and 4 show RTT separately for ULT and DLT. ULT is mostly higher than DLT, but they behave unpredictably with high spikes. Once the LPWAN communication is warmed-up as shown in FIG. 4, i.e. when the RRC state has been "connected" for some time, RTT is in general lower, but still both ULT and DLT show unpredictable spikes. FIG. 5 shows a differential ULT-DLT as a parentage of RTT over time. Also, (ULT-DLT)/RTT shows unpredictable spikes, so that RTT cannot be assumed to be symmetric for correcting the latency issue introduced by DLT. However, it was found that the spikes in (ULT-DLT)/RTT correlate with the spikes in RTT. So, if RTT is low, (ULT-DLT)/RTT is low, i.e. RTT is more symmetric. If RTT is high, the (ULT-DLT)/RTT is high, i.e. RTT is less symmetric.

Figure 6:
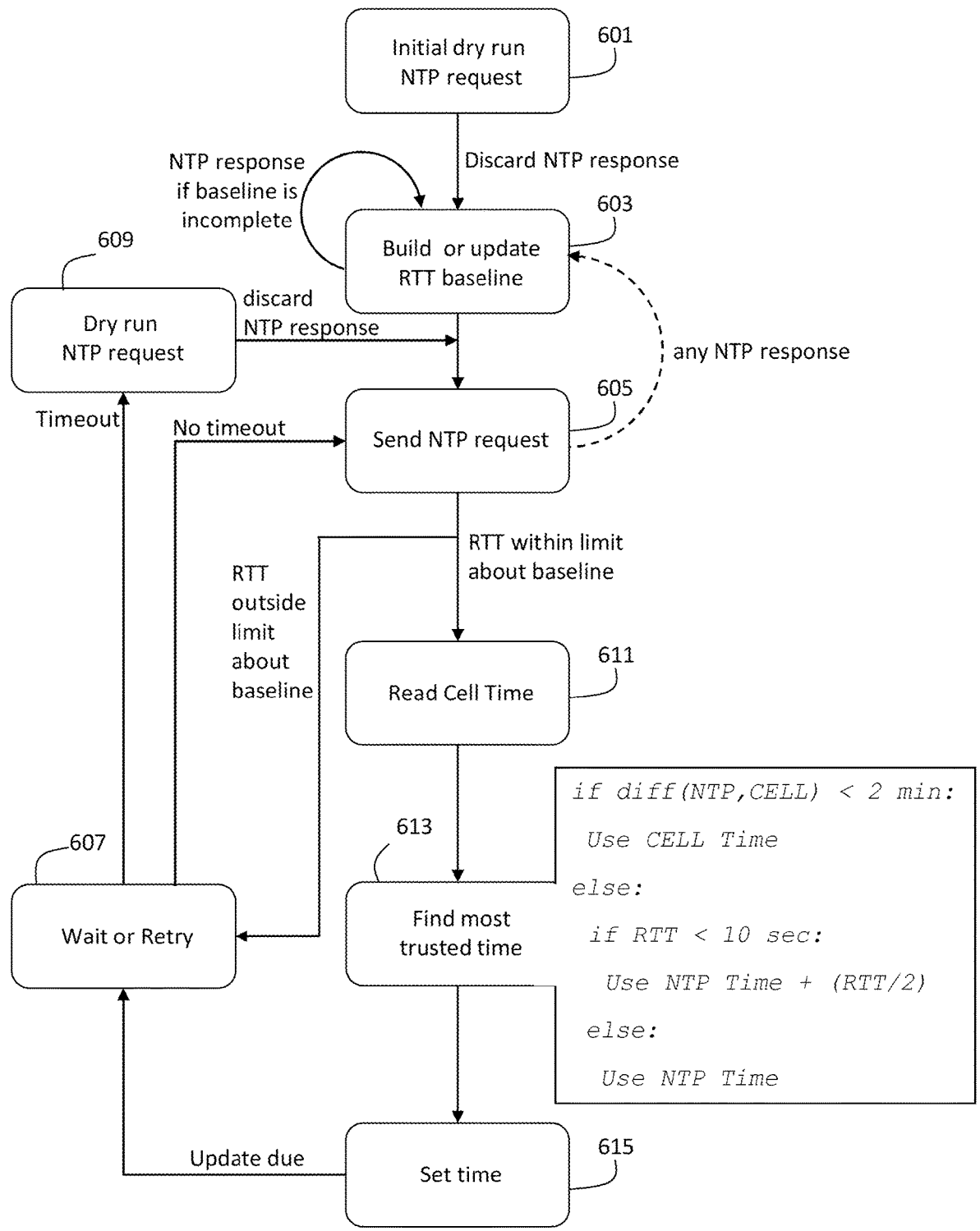
FIG. 6 is a schematic diagram of an example of a configuration of a measuring device disclosed herein.

As a solution based on these findings, FIG. 6 shows a schematic diagram of an example of a configuration of the measuring device 7, wherein the configuration may be implemented by a software program installed and executed on a microcontroller of the measuring device 7. The microcontroller may be part of the LPWAN communication module or a separate part of the measuring device 7. The solution to the latency issues are solved here by three cumulative aspects, i.e.:

1. Conducting a "dry run" NTP request, i.e. the first NTP response after being in RCC state "idle" is discarded;
2. Filtering the received NTP Time by comparing RTT with a generated and updated RTT baseline; and
3. Using the cellular network time if it can be trusted.

Before the first step 601 of conducting a first "dry run" NTP request, the LPWAN communication module may be in RRC state "idle". The microcontroller of the measuring device 7 may wake up or power-up the LPWAN communication module to switch to RRC state "connected". The NTP response received in the initial dry run 601 is discarded, because latency issues are worst at the beginning of a LPWAN communication as shown in FIG. 3. In step 603, an RTT baseline is determined based on measuring RTT for a pre-determined number of consecutive NTP requests. The RTT baseline is stored and does not have to be generated from scratch after each wake-up. It is preferably only updated based on a sliding window or as a weighted moving average (WMA). It should be noted that the discarded NTP response from the dry run is preferably not used for determining the RTT baseline. Once the RTT baseline is complete, a proper NTP request is sent in step 605. The NTP Time received in response to that NTP request is filtered, i.e. discarded if RTT exceeds the RTT baseline by a pre-determined limit. If it is filtered out, the LPWAN communication module may wait and/or retry in step 607 the NTP request until a timeout. After timeout, another dry run may be conducted in step 609 before another proper NTP request 605 is sent. It should be noted that, irrespective of whether the received NTP Time is filtered out or not, the NTP Time received in response to the proper NTP request 605 is always used to update the RTT baseline. Thereby, the RTT baseline can be adjusted to a general step in RTT (see FIG. 7), e.g. due to a change in the used communication standard.

If RTT is within the limit about the RTT baseline, a cellular network time, i.e. Cell Time, is read in step 611. The Cell Time is preferably derived from the System Information Block 16 (SIB16) received automatically from the base station 5 on the network layer of the LPWAN communication protocol. In step 613, the most trusted time is found according to an algorithm displayed in pseudo programming code. The Cell Time is most trusted and used if the Cell Time lies within a pre-determined range, e.g. two minutes, about the received NTP Time. This is, because the Cell Time has less latency issues than the NTP Time even after filtering. However, the Cell Time is not trusted if it lies outside of the pre-determined range of two minutes about the NTP Time. In this case, it is checked if RTT is below a predetermined threshold, e.g. ten seconds. If so, RTT can be assumed to be symmetric and RTT/2 is added to the NTP Time. The adjusted NTP Time, i.e. NTP+RTT/2, is then most trusted and used. If RTT is above the threshold of ten seconds, the received NTP Time as such is most trusted and used. The current clock time is then set in step 615 to the most trusted time. When a clock update is due to a predetermined schedule, the process may start again at step 601 if the LPWAN communication module was set to RRC state "idle" in the meanwhile. If the LPWAN communication module is still in RRC state "connected", the process may continue with step 607 by waiting or sending a further NTP time request.

Figure 7:
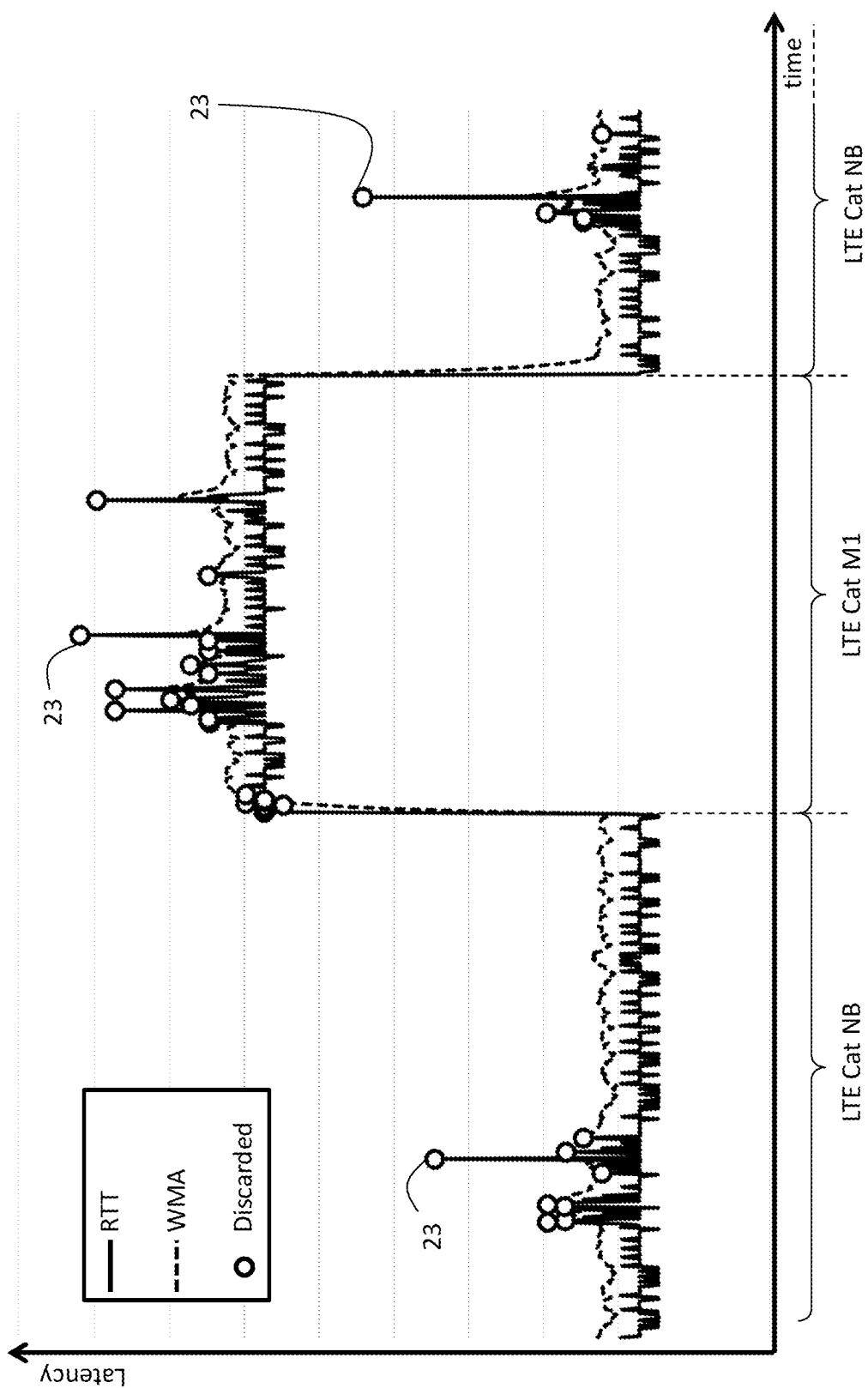
FIG. 7 is a diagram of a determined latency over time for a LPWAN communication module with changes in the communication standard and a filtering applied by a measuring device disclosed herein.

FIG. 7 shows the filtering of the received NTP Time according to RTT in comparison with the adaptive RTT baseline. RTT is shown as a solid line, whereas the adaptive RTT baseline being calculated as a weighted moving average (WMA) is shown as a dashed line. Outliers 23 of RTT are marked by a circle and filtered out for deviating too much from the adaptive RTT baseline. A switch of the communication standard from LTE Cat NB to LTE Cat M1 has the effect that RTT is significantly higher for all NTP time requests. The first few received NTP Times after the switch are discarded, because the RTT baseline was not adjusted yet. However, as the discarded received NTP Times are also included for determining the RTT baseline, the RTT baseline is quickly adapted to the higher level, so that received NTP Times are only filtered with reference to the new higher RTT baseline level. When the communication standard is switched back from LTE Cat M1 to LTE Cat NB, the overall RTT level drops again and none of the first few received NTP Times is filtered out. Quickly, the RTT baseline is set back to the lower RTT level, so that outliers are filtered out again with reference to the lower RTT baseline level.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one aspect or embodiment may be used alone, or in combination with other features described, and may also be used in combination with one or more features of any other of the aspects or embodiments, or any combination of any other of the aspects or embodiments. While at least one exemplary aspect or embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary aspects or embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 meter reading system
3 HES
5 base station
7 measuring device
9 LPWAN connection using NB-IoT or LTE-M
11 internet connection
13 mains electricity line
15 wired connection
17 NTP request
19 NTP server
21 NTP response
23 RTT outliers
601 Initial dry run NTP request
603 Build and update RTT baseline
605 Send proper NTP request
607 Wait or Retry
609 Another dry run NTP request
611 Read Cell Time
613 Find most trusted time
615 Set time

What is claimed is:

1. A stationary measuring device for measuring or detecting a value at a utility installation, the measuring device comprising a low power wide area network (LPWAN) communication module configured to establish a wireless communication connection to a LPWAN for communicating data to a head-end-system via the LPWAN, wherein the LPWAN communication module is configured to:

send a request for a first clock time from the measuring device to a time server;
receive the first clock time from the time server in response to the request;
receive a second clock time from a base station of the LPWAN;
compare the first clock time and the second clock time with each other; and
determine a current clock time based on the second clock time if the second clock time lies within a pre-determined range about the first clock time.

2. The measuring device according to claim 1, wherein the LPWAN communication module is further configured to determine the current clock time based on the first clock time if the second clock time lies outside of the pre-determined range about the first clock time.

3. The measuring device according to claim 1, wherein the LPWAN communication module is further configured to:
determine a first difference between the first clock time and the second clock time if the second clock time lies outside of the pre-determined range about the first clock time;
determine a residual between the first difference and a whole-numbered multiple of a quarter of an hour; and
determine the current clock time based on a second difference between the second clock time and the whole-numbered multiple of a quarter of an hour if the residual lies within the pre-determined range about the first clock time.

4. The measuring device according to claim 1, wherein the LPWAN communication module is further configured to determine a round-trip time between sending the request and receiving the first clock time, wherein the current clock time is determined to be the first clock time plus half of the round-trip time if:
the second clock time lies outside of the pre-determined range about the first clock time period; and
the determined round-trip time is below a pre-determined threshold.

5. The measuring device according to claim 4, wherein the LPWAN communication module is configured to set the current clock time to the first clock time if the determined round-trip time is at or above the pre-determined threshold.

6. The measuring device according to claim 1, wherein the LPWAN communication module is configured to use a Narrowband Internet of Things (NB-IoT) or a Long-Term Evolution Machine Type Communication (LTE-M) technology standard for the wireless communication in the LPWAN.

7. The measuring device according to claim 6, wherein the LPWAN communication module is configured to use any standard in the group comprising: LTE Cat M1, LTE Cat M2, LTE Cat NB1, and LTE Cat NB2M2.

8. The measuring device according to claim 1, wherein the first clock time is a NTP time provided by a network time protocol (NTP) server.

9. The measuring device according to claim 1, wherein the second clock time is a cellular network time of the LPWAN.

10. The measuring device according to claim 1, wherein the LPWAN communication module is configured to discard the received first clock time unless a certain minimum amount of data has been communicated since establishing a LPWAN connection.

11. The measuring device according to claim 1, wherein the LPWAN communication module is configured to always discard the first clock time received after establishing a LPWAN connection and to request another first clock time.

12. The measuring device according to claim 1, wherein the LPWAN communication module is further configured to determine a baseline, based on measuring a round-trip time between sending the request and receiving the first clock time, for each of a pre-determined number of consecutive requests, and to discard any first clock time with a round-trip time exceeding the baseline by a pre-determined limit.

13. The measuring device according to claim 11, wherein the LPWAN communication module is configured to include discarded round-trip times exceeding the baseline by the pre-determined limit for adapting the baseline.

14. The measuring device according to claim 1, wherein the time server is part of the head-end-system.

15. The measuring device according to claim 1, wherein the LPWAN communication module is further configured to receive the second clock time from the base station of the LPWAN automatically when the LPWAN communication module establishes a LPWAN connection with the base station.

16. The measuring device according to claim 1, wherein the measuring device is a consumption meter for registering a consumption of electric power, wherein the consumption meter is powered by the electric power to be registered.

* * * * *